(12) United States Patent
Kern

(10) Patent No.: US 11,585,034 B2
(45) Date of Patent: Feb. 21, 2023

(54) WASHER APPLIANCE WITH REMOVABLE AGITATOR POST USING LATCHES AND TORQUE TRANSMITTING SHAPE

(71) Applicant: Haier US Appliance Solutions, Inc., Wilmington, DE (US)

(72) Inventor: Jeffrey Alan Kern, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/202,907

(22) Filed: Mar. 16, 2021

(65) Prior Publication Data

US 2022/0298703 A1 Sep. 22, 2022

(51) Int. Cl.
*D06F 37/40* (2006.01)
*F16B 19/00* (2006.01)
*D06F 23/04* (2006.01)
*D06F 37/24* (2006.01)

(52) U.S. Cl.
CPC .............. *D06F 37/40* (2013.01); *D06F 23/04* (2013.01); *D06F 37/24* (2013.01); *F16B 19/00* (2013.01)

(58) Field of Classification Search
None
See application file for complete search history.

(56) References Cited

U.S. PATENT DOCUMENTS

| | | | | |
|---|---|---|---|---|
| 4,077,239 A | * | 3/1978 | Platt | D06F 13/02 68/184 |
| 5,473,916 A | | 12/1995 | Ye | |
| 5,651,278 A | * | 7/1997 | Pinkowski | D06F 13/02 68/133 |
| 10,787,761 B2 | | 9/2020 | Czarnecki | |
| 2004/0016267 A1 | * | 1/2004 | Clark | D06F 13/02 68/133 |
| 2016/0032515 A1 | * | 2/2016 | Lee | D06F 17/08 68/131 |
| 2019/0062978 A1 | * | 2/2019 | Czarnecki | D06F 37/12 |
| 2021/0062382 A1 | * | 3/2021 | Andrejczuk | D06F 17/10 |

FOREIGN PATENT DOCUMENTS

BR MU9002286 U2 3/2013
CN 2571803 Y 9/2003

* cited by examiner

*Primary Examiner* — Cristi J Tate-Sims
(74) *Attorney, Agent, or Firm* — Dority & Manning, P.A.

(57) ABSTRACT

A washer appliance includes an impeller and impeller interface. An agitator post is removably positioned upon the impeller interface. A plurality of latches are supported by the agitator post and spaced apart circumferentially. Each latch may be configured for pivoting in and out of one of a plurality of latch recesses provided by the impeller interface when the agitator post is positioned on the impeller interface. Biasing members urge the latch into the latch recesses when the agitator post is positioned on the impeller interface.

19 Claims, 10 Drawing Sheets

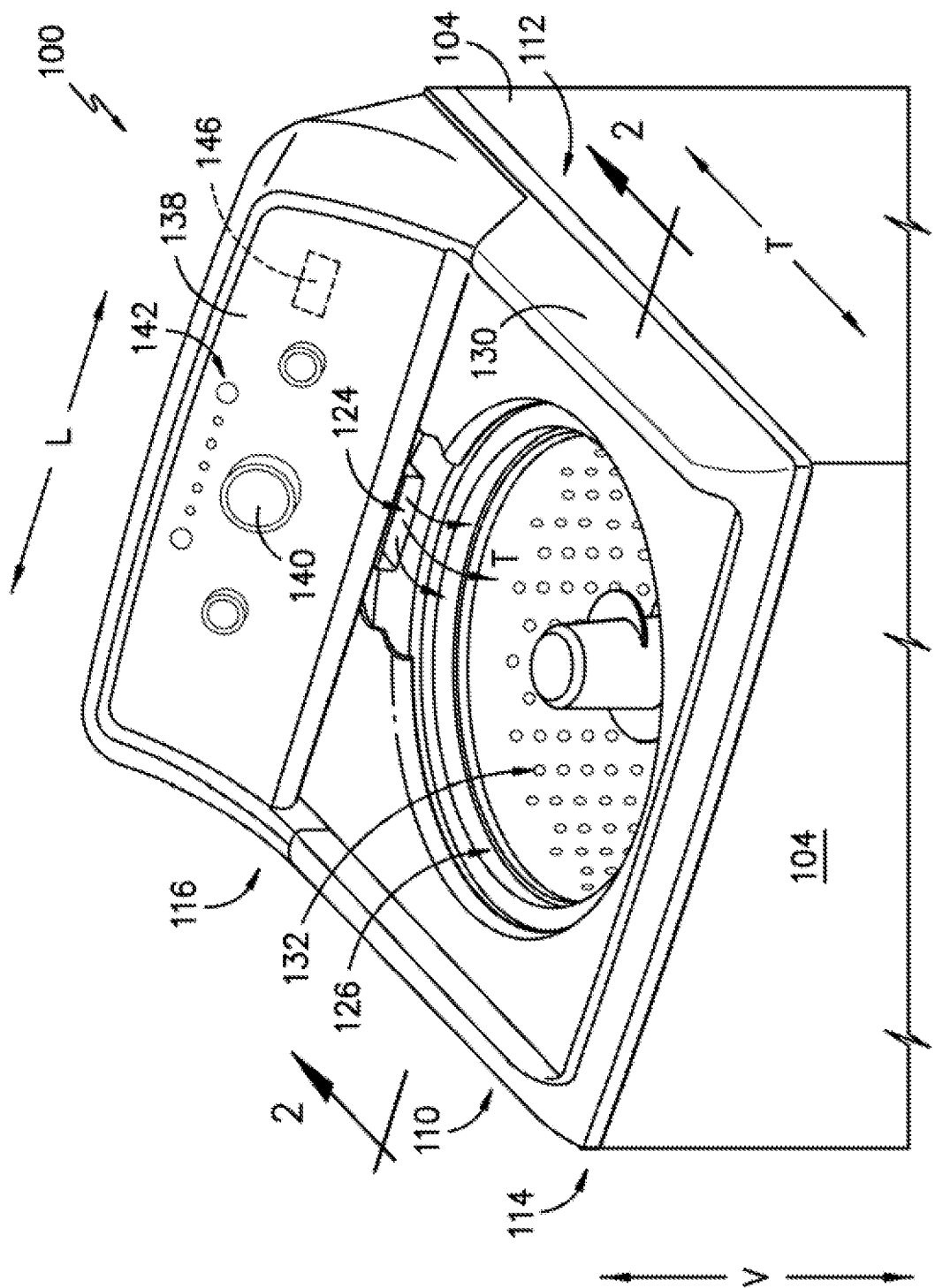
FIG. -1-

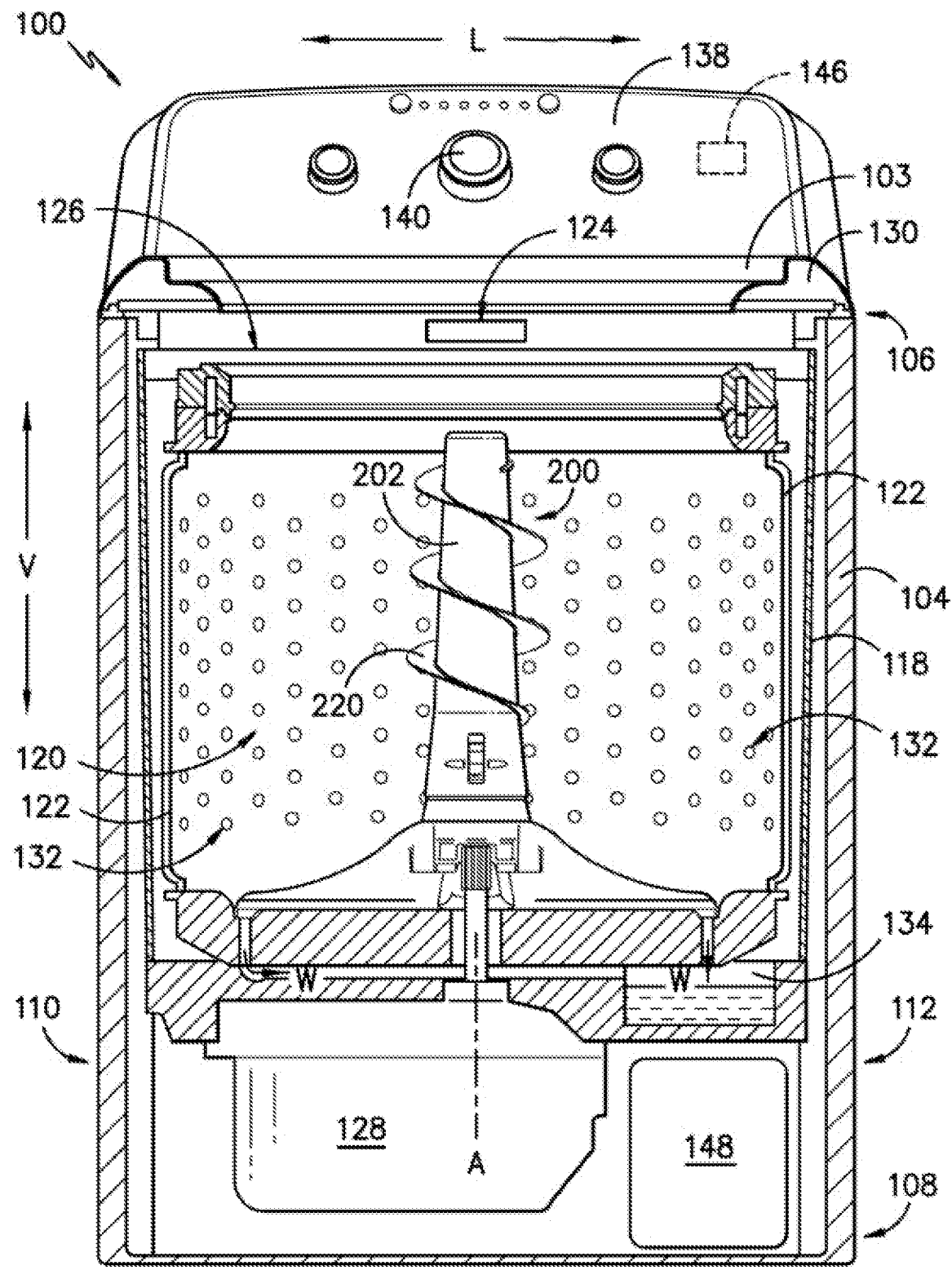
FIG. -2-

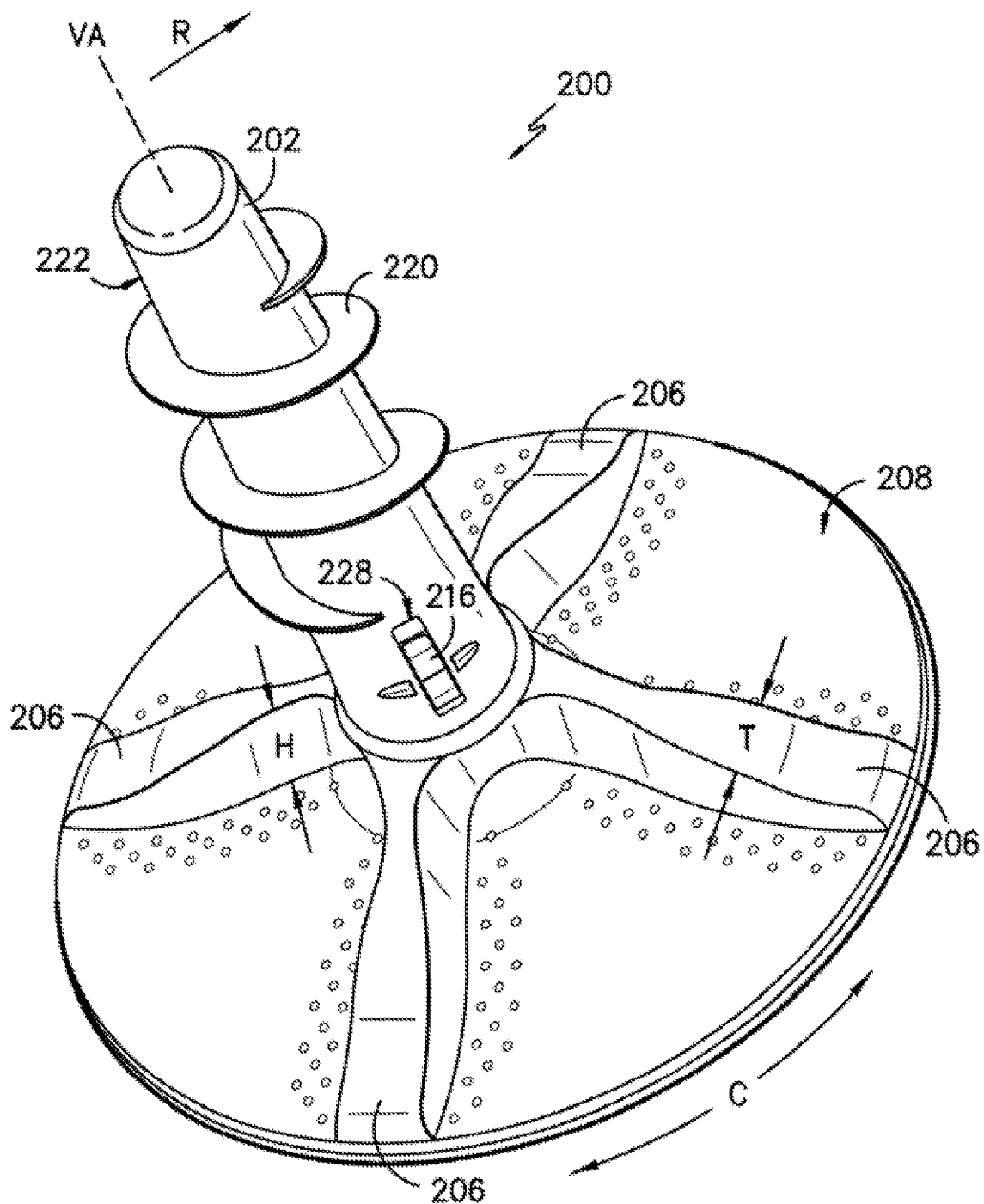
FIG. -3-

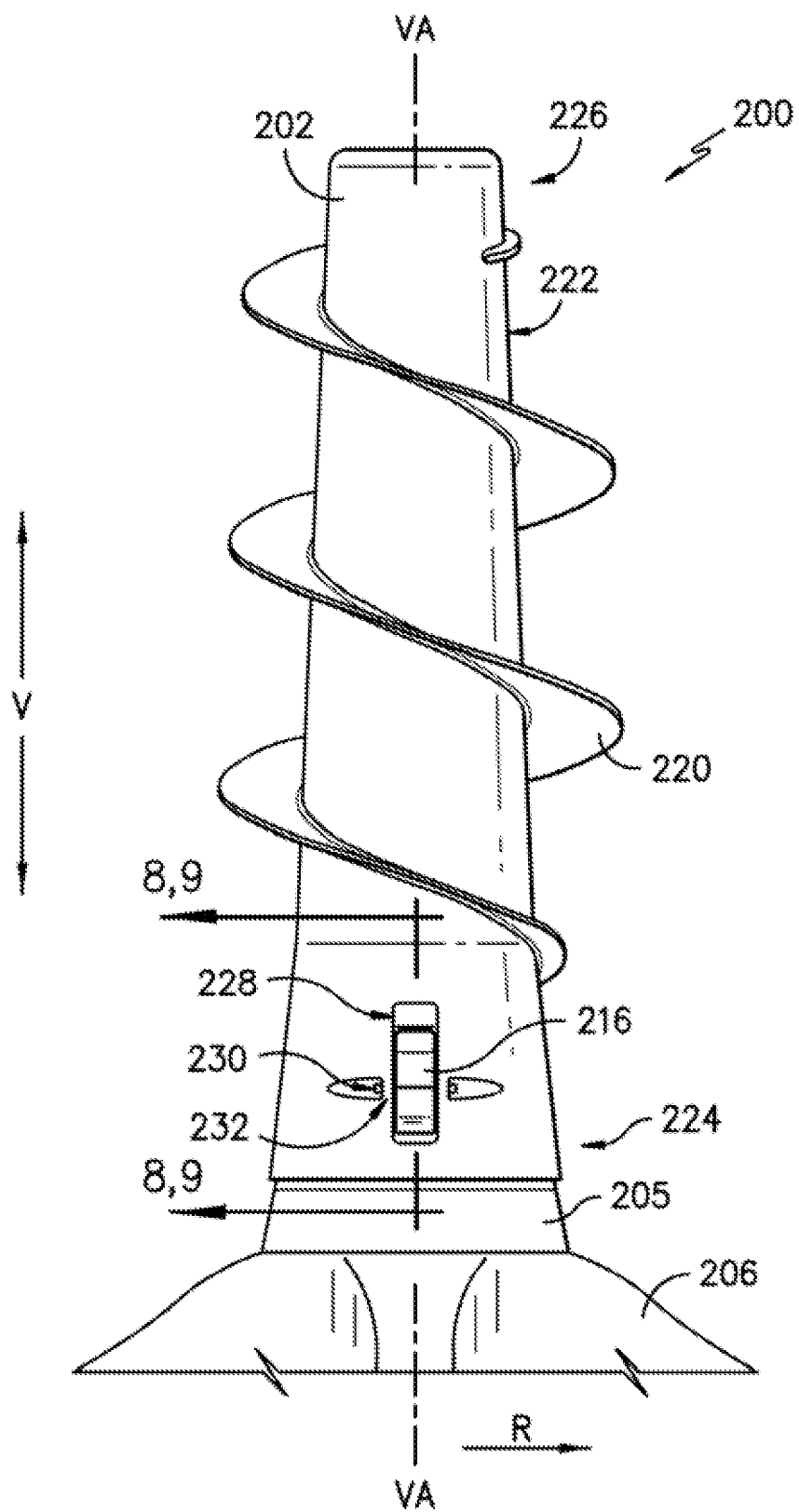
FIG. -4-

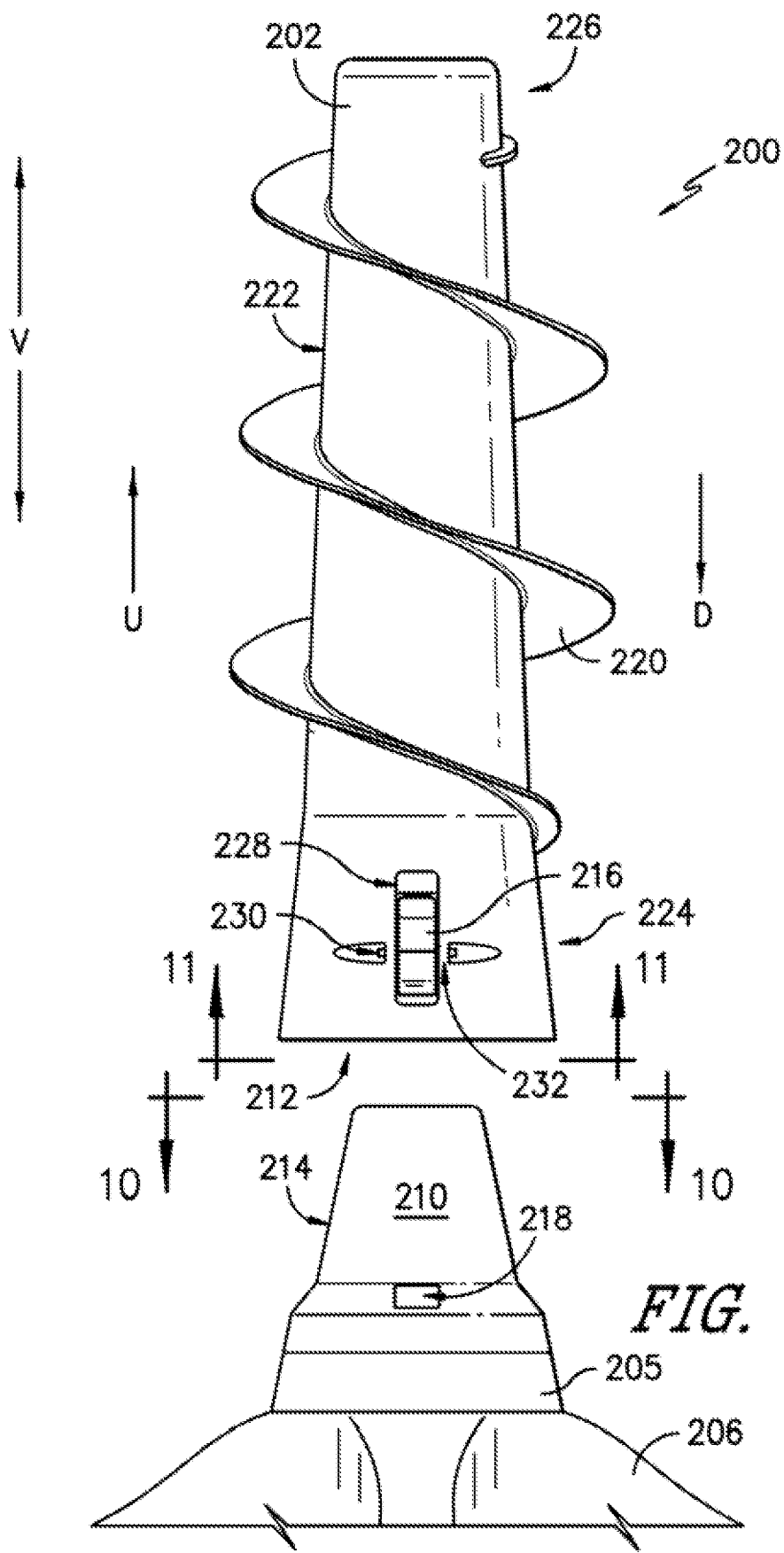
FIG. -5-

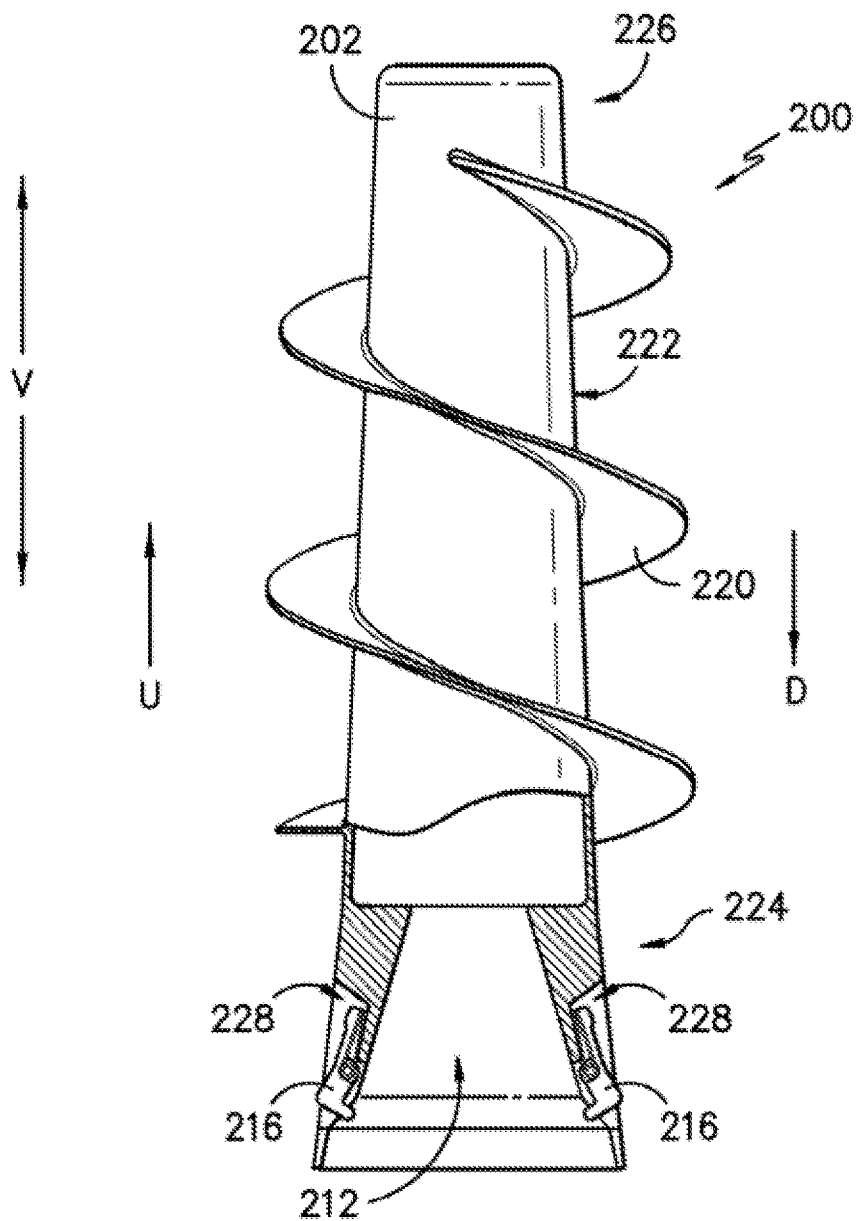
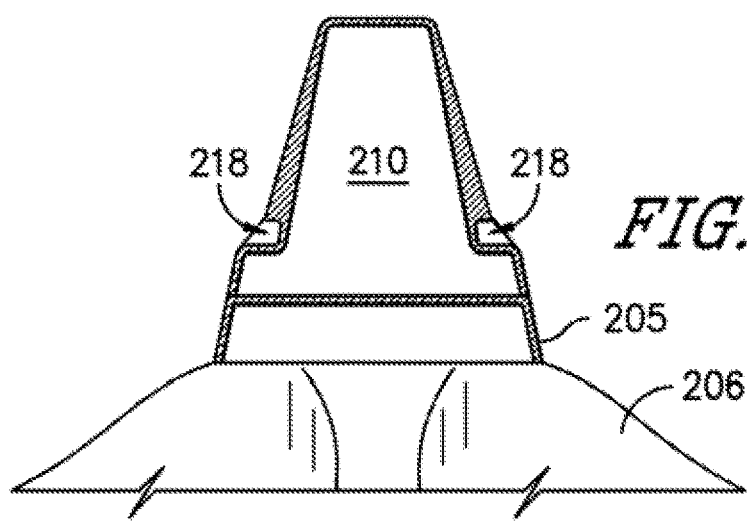
FIG. -6-

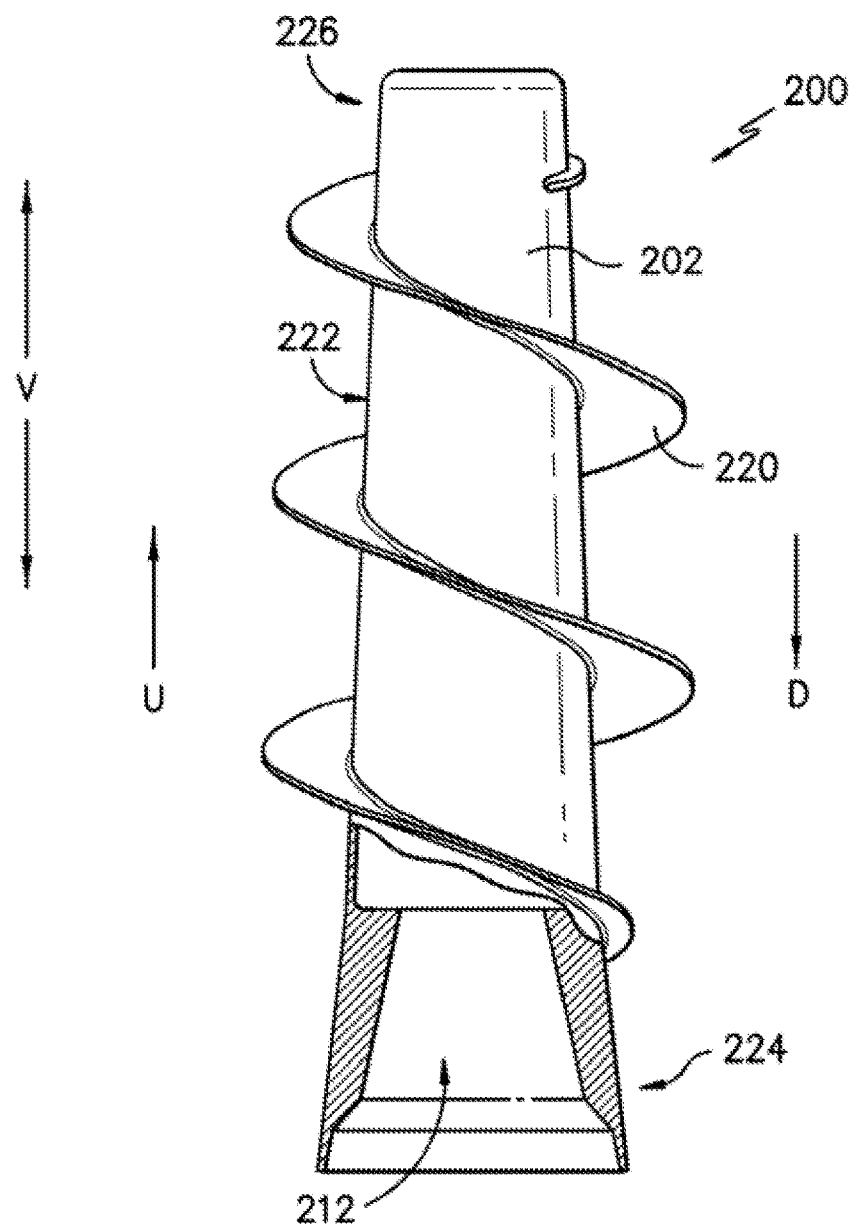
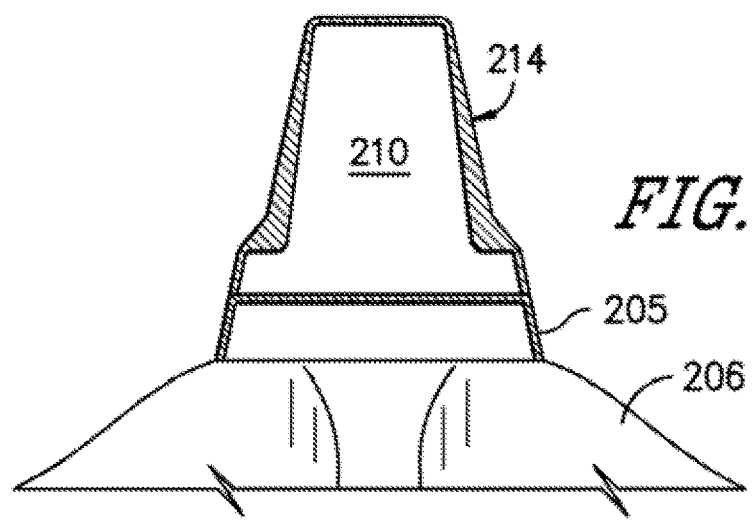
FIG. -7-

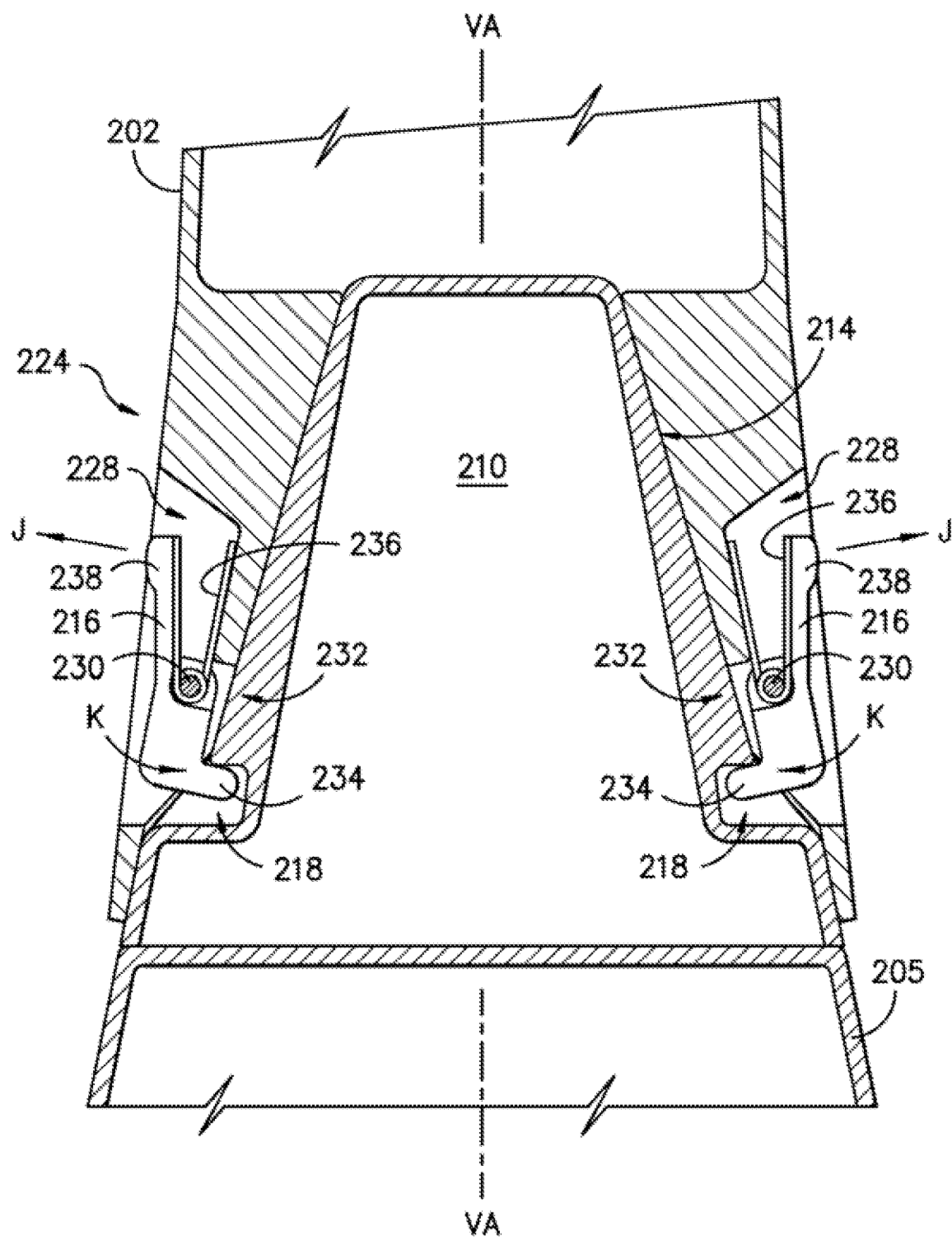
FIG. -8-

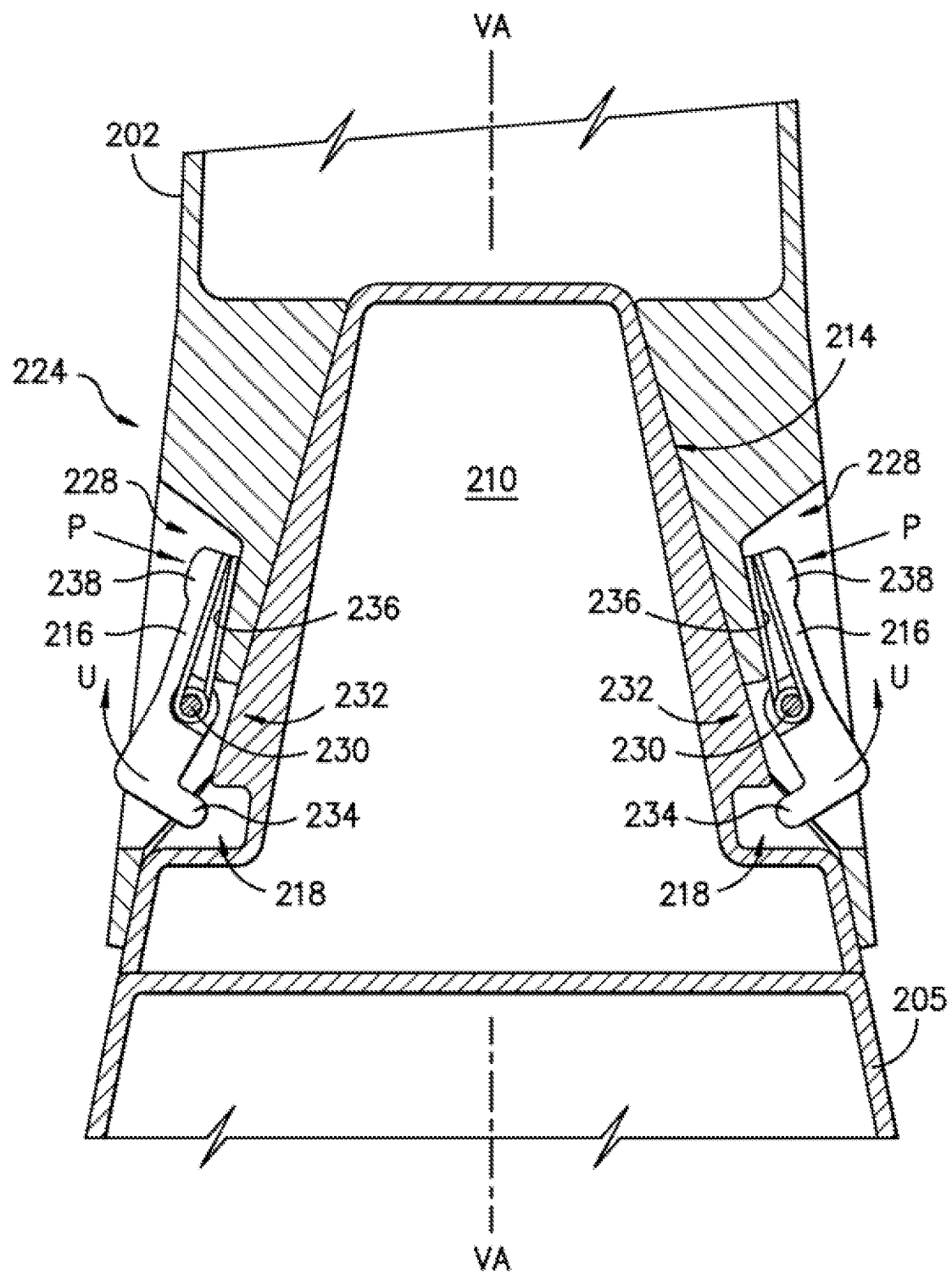
FIG. -9-

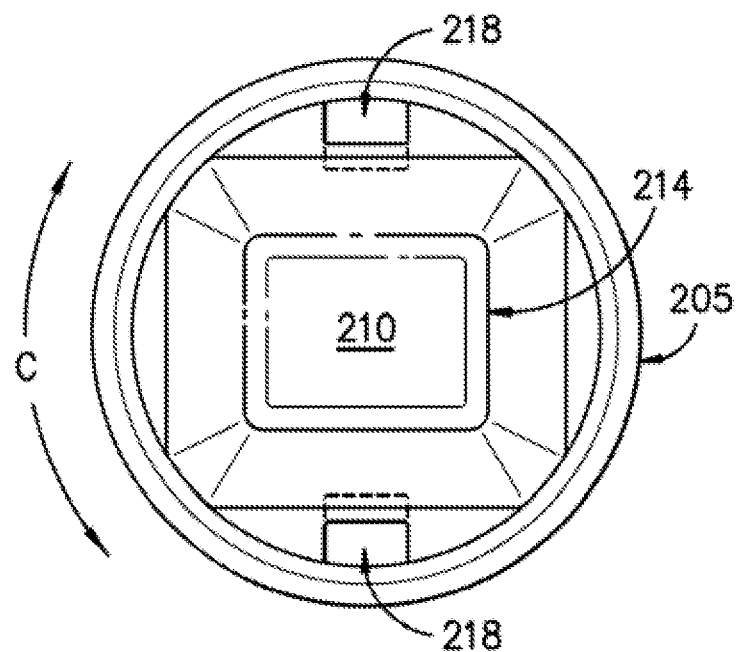
FIG. -10-
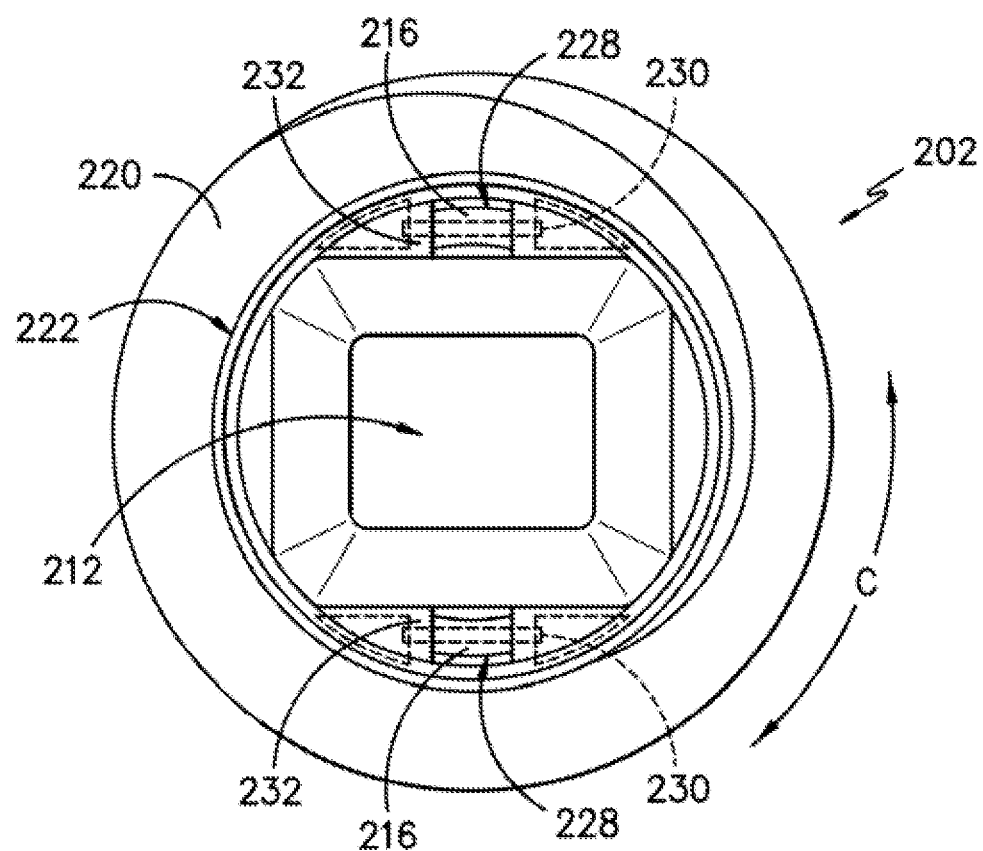
FIG. -11-

WASHER APPLIANCE WITH REMOVABLE AGITATOR POST USING LATCHES AND TORQUE TRANSMITTING SHAPE

FIELD OF THE INVENTION

The subject matter of the present disclosure relates generally to a washer appliance having a removable agitator post.

BACKGROUND OF THE INVENTION

Washing appliances (also referred to as "washing machines") typically include a drum or basket for receipt of articles to be washed. Top-load or vertical axis washing machines rotate the drum about the vertical axis at various points during the cleaning cycle. Various components provide for adding fluid into the drum and for imparting motion to the fluid and articles being washed in order to clean the articles.

Conventionally, the washing appliance may include a knob or other switch by which the user selects the level of fluid in the vertical axis washing machine based on e.g., the load size of articles being washed. The user visually determines the desired fluid level based on the anticipated load size. Many washing appliance users are also accustomed to seeing a conventional agitator in the form of a post extending up from the bottom of the wash basket and configured to impart motion to the fluid and articles during the cleaning cycles. Users may associate factors such as fluid level and movement of the agitator as directly related to the effective cleaning of the articles and may believe that increased fluids levels and agitator action are advantageous.

Certain articles may require more wash space within the wash drum. For example, large garments, pillows, comforters and the like may require more volume for washing than typical articles of clothing. Sufficient space is required in order for the washing appliance to be able to impart motion to the articles and wash fluid as part of the cleaning process. Conventional agitator designs having a post that extends into the wash basket necessarily consume at least part of this space. In addition, in such designs the agitator is typically not designed for removal by the user of the appliance.

Improvements in technology and increasing water conservation requirements have resulted in washing appliances that can use less water during the cleaning cycle and may use features other than the conventional post-type agitator for imparting the desired movement of the articles within the wash basket or wash drum. For example, rotatable impellers have been developed that can impart the desired movement while consuming less volume inside the wash drum than the conventional agitator. Some washing appliances utilizing such designs may also be able to use less water during the cleaning cycle as well.

However, user perception of washing machine features that provide for the best cleaning experience may contradict the actual impact of such features. As previously mentioned, consumers familiar with a conventional post-type agitator extending vertically from the bottom of the wash drum may be reluctant to purchase or use a vertical-axis washing appliance lacking such feature. Yet, depending on the particular design employed, an impeller located at the bottom of the wash drum may have more impact in creating the desired agitation and cleaning of articles than the conventional agitator—including under conditions of less water usage.

And for larger loads or loads with larger articles, the space consumed by the conventional post-type agitator is needed for the articles.

Accordingly, a washing appliance with a removable agitator would be useful. More particularly, a washing appliance that allows the user to readily install or remove an agitator while still providing for effective cleaning of articles would be beneficial. Such as washing appliance that can allow of the installation or removal without requiring special tools would be particularly beneficial.

BRIEF DESCRIPTION OF THE INVENTION

Additional aspects and advantages of the invention will be set forth in part in the following description, or may be apparent from the description, or may be learned through practice of the invention.

In one exemplary embodiment, the present invention provides a washing appliance having a cabinet and a wash tub positioned in the cabinet and defining a wash chamber. A wash drum is rotatably mounted within the wash chamber and is configured for receiving articles for washing. An impeller is positioned in the wash drum. The impeller is rotational about a vertical axis and configured for imparting motion to the articles during washing. The impeller may include a centrally-located impeller interface supported upon the impeller and project along the vertical axis from the impeller. The impeller interface can define a plurality of latch recesses spaced apart circumferentially. An agitator post can be removably positioned upon the impeller interface. A plurality of latches may be supported by the agitator post and spaced apart circumferentially with each latch configured for pivoting in and out of one of the latch recesses when the agitator post is positioned on the impeller interface. A plurality of biasing members may be provided that are connected to the latches and are configured to urge the latches into the latch recesses when the agitator post is positioned on the impeller interface.

In another exemplary embodiment, the present invention provides a washing appliance including a cabinet and a wash tub positioned in the cabinet and defining a wash chamber. A wash drum is rotatably mounted within the wash chamber and configured for receiving articles for washing. An impeller is positioned in the wash drum, the impeller being rotational about a vertical axis and configured for imparting motion to the articles during washing. An impeller interface may be supported upon the impeller and project along the vertical axis, the impeller interface defining at least one latch recess. An agitator post can be removably positioned upon the impeller interface. At least one latch may be supported by the agitator post and configured for pivoting in and out of the latch recess when the agitator post is positioned on the impeller interface. At least one biasing member may be connected to the latch and configured to urge the latches into the latch recess when the agitator post is positioned on the impeller interface.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a partial perspective view of an exemplary embodiment of a washing machine of the present invention.

FIG. 2 provides a front cross-sectional view of the exemplary washing machine of FIG. 1.

FIG. 3 provides a perspective view of an exemplary embodiment of an article movement mechanism of the present invention in which an exemplary agitator post is included.

FIG. 4 provides an assembled side view of the exemplary article movement mechanism of FIG. 3.

FIG. 5 is an exploded side view of a portion of the exemplary article movement mechanism of FIG. 3.

FIG. 6 is an exploded, and partially cross-sectional side view of a portion of the exemplary article movement mechanism of FIG. 3.

FIG. 7 is an exploded, and partially cross-sectional side view of a portion of the exemplary article movement mechanism of FIG. 3 albeit from a side view that is 90 degrees from that of FIG. 6.

FIG. 8 is a cross-sectional side view of a portion of the exemplary article movement mechanism of FIG. 4 taken along lines 8-8 and with latches shown in a locking position.

FIG. 9 is a cross-sectional side view of a portion of the exemplary article movement mechanism of FIG. 4 taken along lines 9-9 and with latches shown in an unlocked position.

FIG. 10 is a top view of the exemplary article selection mechanism of previous figures as viewed along the direction of lines 10-10 in FIG. 5.

FIG. 11 is a bottom view of the exemplary article selection mechanism of previous figures as viewed along the direction of lines 11-11 in FIG. 5.

The use of the same or similar reference numbers in the figures denotes same or similar features unless the context indicates otherwise.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIGS. 1 and 2 illustrate an exemplary embodiment of a vertical axis washing appliance 100 of the present invention, which is also sometimes referred to as a top loading or vertical axis washing machine. In FIG. 1, a door 103 (shown in FIG. 2) has been removed for purposes of illustrating other features of the invention. Washing machine appliance 100 has a cabinet 104 that extends between a top portion 106 and a bottom portion 108 along the vertical direction V, between a first side (left) 110 and a second side (right) 112 along the lateral direction L, and between a front 114 and a rear 116 along the transverse direction T. The present invention is not limited to the particular vertical axis washing appliance 100 shown in the figures. Using the teachings disclosed herein, one or skill in the art will understand the other embodiments of a washing machine are also in the scope of the present invention.

As best shown in FIG. 2, a wash tub 118 is positioned within cabinet 102, defines a wash chamber 120, and is generally configured for retaining wash fluids during an operating cycle. A wash drum 122 is rotatably mounted within wash chamber 120 of wash tub 118. Washing machine appliance 100 further includes a dispenser 124 for dispensing wash fluid into wash tub 118. In addition, appliance 100 may include one or more additional dispensers for directing fluid into wash tub 118 and each dispenser may be separately controlled by one or more valves controlling flow to each dispenser independently of the others. The term "wash fluid" refers to a liquid used for washing and/or rinsing articles during an operating cycle and may include any combination of water, detergent, fabric softener, bleach, and other wash additives or treatments. As used herein, the term "cleaning cycle" includes a wash cycle, rinse cycle, spin cycle, or combinations thereof.

Wash drum 122 and cabinet 104 generally define an opening 126 (accessible through door 103) for receipt of articles for washing. Wash drum 122 rotates about a vertical axis of rotation VA (FIGS. 2 and 3) powered by motor assembly 128. According to the illustrated embodiment, the axis of rotation VA is substantially parallel to the vertical direction V. As used herein, terms of approximation, such as "approximately," "substantially," or "about," refer to being within a ten percent margin of error.

As illustrated, cabinet 104 of washing machine appliance 100 has a top panel 130. Top panel 130 defines an opening (FIG. 1) that coincides with opening 126 of wash tub 118 to permit a user access to wash drum 122. Door 103 is rotatably mounted to top panel 130 to permit selective access to opening 126. In particular, door 103 selectively rotates between a closed position and an open position. In the closed position, door 103 inhibits access to wash drum 122. Conversely, in the open position, a user can access wash drum 122. Although door 103 is illustrated as mounted to top panel 130, door 103 may alternatively be mounted to cabinet 104 or any other suitable support.

As best shown in FIG. 2, wash drum 122 further defines a plurality of perforations 132 to facilitate fluid communication between an interior of wash drum 122 and wash tub 118. In this regard, wash drum 122 is spaced apart from wash tub 118 to define a space for wash fluid to escape wash chamber 120. During a spin cycle, wash fluid within articles being washed (e.g., clothing) and within wash chamber 120 is urged through perforations 132 wherein it may collect in a sump 134 defined by wash tub 118. Washing machine appliance 100 further includes a pump assembly 148 (FIG. 2) that is located beneath wash tub 118 and wash drum 122 for gravity assisted flow when draining wash tub 118.

An exemplary article movement mechanism 200, including impeller 204 (FIGS. 2 and 3) and agitator post 202, is rotatably mounted within wash drum 122 to impart motion to articles and liquid in wash drum 122. More specifically, impeller 204 and agitator post 202 extend into wash drum 122 and assist agitation of articles disposed within wash drum 122 (as will be later described) during operation of washing appliance 100, e.g., to facilitate improved cleaning. For this exemplary embodiment, agitator post 202 includes a helical vane 220 extending from the exterior surface 222 of agitator post 202 between bottom end 224 and top end 226 thereof. Helical vane 220 may be configured to assist the agitation of articles or support the overall desired motion thereof during a cleaning cycle. As will be understood by one of skill in the art using teachings disclosed herein, helical vane 220 may have different shapes, thickness, and other features from what is depicted in the figures and may actually include multiples sets of overlapping or non-overlapping vanes.

In different embodiments, impeller 204 and agitator post 202 may rotate separately or together. Such rotations include a single action element (i.e., oscillatory only), a double action element (oscillatory movement at one end, single direction rotation at the other end) or a triple action element (oscillatory movement plus single direction rotation at one end, single direction rotation at the other end). Impeller 204, agitator post 202, and wash drum 122 are oriented to rotate about a vertical axis of rotation VA (which is substantially parallel to vertical direction V). For example, impeller 204 and/or agitator post 202 may rotate back and forth in alternate directions about vertical axis VA during a cleaning cycle. Additional description of the actions of impeller 204 and agitator post 202 are set forth below.

As stated, washing machine appliance 100 includes a motor assembly 128 in mechanical communication with wash drum 122 to selectively rotate wash drum 122 (e.g., during a wash cycle or a rinse cycle of washing machine appliance 100). In addition, motor assembly 128 may also be in mechanical communication with impeller 204 and agitator post 202. In this manner, motor assembly 128 may be configured for selectively and independently rotating or oscillating wash drum 122, impeller 204, and/or agitator post 202 during various operating cycles of washing machine appliance 100.

Referring still to FIGS. 1 through 3, a control panel 138 with at least one input selector 140 (FIGS. 1 and 2) extends from top panel 130. Control panel 138 and input selector 140 collectively form a user interface input for operator selection of machine cycles and features of washing appliance 100. A display 142 of control panel 138 indicates selected features, operation mode, a countdown timer, and/or other items of interest to appliance users regarding operation.

Operation of washing machine appliance 100 is controlled by at least one controller or processing device 146 that is operatively coupled to control panel 138 for user manipulation to select washing machine cycles and features. In response to user manipulation of control panel 138, controller 146 operates the various components of washing machine appliance 100 to execute selected machine cycles and features. According to an exemplary embodiment, controller 146 may include a memory and microprocessor, such as a general or special purpose microprocessor operable to execute programming instructions or micro-control code associated with methods described herein. Alternatively, controller 146 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 138 and other components of washing machine appliance 100 may be in communication with controller 146 via one or more signal lines or shared communication busses.

During operation of washing machine appliance 100, laundry items are loaded into wash drum 122 through opening 126, and washing operation is initiated through operator manipulation of input selector 140. Water, detergent and/or other fluid additives can be added to wash tub 118 and wash drum 122 through dispenser 124 and/or other dispensers as well. Controller 146 can operate one or more valves of washing appliance 100 to provide for filling wash tub 118 and wash drum 122 to the appropriate level for the amount of articles being washed and/or rinsed. By way of example for a wash mode, once wash drum 122 is properly filled with fluid, the contents of wash drum 122 can be agitated (e.g., with article movement mechanism 200 as discussed previously) for washing of laundry items in wash drum 122. The specific operation of wash appliance 100 by controller 146 will depend on various inputs including the cycle and other settings that may be selected by the user, the amount of article placed in wash chamber 120, and other variables as will be understood by one of skill in the art using the teachings disclosed herein.

By way of continuing example, after wash tub 118 is filled and the agitation phase of the wash cycle is completed, wash tub 118 and drum 122 can be drained, e.g., by drain pump assembly 148. Laundry articles can then be rinsed by again adding fluid to wash drum 122 and tub 118 again depending on the specifics of the cleaning cycle selected by a user. The impeller 204 and/or agitator post 202 may also provide agitation within wash drum 122. One or more spin cycles may also be used as part of the cleaning process. In particular, a spin cycle may be applied after the wash cycle and/or after the rinse cycle in order to wring wash fluid from the articles being washed. During a spin cycle, wash drum 122 is rotated at relatively high speeds to help wring fluid from the laundry articles through perforations 132. After articles disposed in wash drum 122 are cleaned and/or washed, the user can remove the articles from wash drum 122, e.g., by reaching into wash drum 122 through opening 126.

As will now be further described, the exemplary article movement mechanism 200 allows desired movements to be imparted to articles in wash drum 122 during a cleaning cycle. These movements, which can include combinations of movement along vertical direction V and radial direction R, assist in cleaning articles while in the wash fluid. One exemplary pattern of movement will now be described. Using the teachings disclosed herein, one of skill in the art will understand that other patterns or paths of fluid and/or article movement in drum 122 may be used as well in other embodiments of the invention.

For example, after articles to be cleaned and fluid are loaded into cylindrical wash drum 122, rotations of impeller 204 may impart an inverse toroidal motion to articles in wash drum 122 during a cleaning cycle. In such motion, articles may move vertically upward from impeller 204 along agitator post 202 and then radially outward (the radial direction is indicated by arrow R in FIG. 3, which is a direction perpendicular to vertical axis VA) at the top of an article load towards the cylindrical portion 123 of wash drum 122.

The articles then move vertically downward towards impeller 204 and radially inward along the bottom of an article load towards agitator post 202 where the cycle repeats under the influence of components such as impeller 204. Accordingly, during a cleaning cycle, this inverse toroidal motion results generally in a turnover of articles in wash drum 122. As used herein, "inverse toroidal motion" or "inverse toroidal movement" does not refer to the specific movement necessarily of any individual article but to the overall movement of articles in wash drum 122 instead. A variety of factors create the inverse toroidal motion the occurs in wash drum 122 including, for example, the relative amounts of fluid and articles present in drum 122, the shape of wash drum 122, the configuration and movements of agitator post 202, the configuration and movements of impeller 204, and other factors as well.

With reference to FIG. 3, for this exemplary embodiment, impeller 204 includes a plurality of radial lobes 206 spaced apart along circumferential direction C. Each lobe 206 has thickness T as measured along the circumferential direction C that varies moving along radial direction R. For the exemplary embodiment shown, thickness T narrows and then widens moving along radial direction R and away from agitator post 202. Each lobe 206 also has a height H above impeller base 208 along axial direction A that also varies along radial direction R. For the exemplary embodiment shown, height H gradually decreases moving along radial direction R and away from agitator post 202. Impeller 204 as depicted in FIGS. 2 and 3 is provided by way of example only. Other shapes and configurations may be used as well.

As noted, the configuration of impeller 204 assists in creating the desired movement of fluid and/or articles within wash drum 122. Article movement mechanism 200 also includes an agitator post 202 which may assist in providing or supporting the desired movement. In addition, using features as will also be described, agitator post 202 can be readily installed or removed by a user of appliance 100 without the use of special tools. Removal of agitator post 202 allows more volume within wash drum 122 for the receipt of articles and/or fluid. At the same time, agitator post 202 can be readily installed as may be needed for a particular movement of articles in drum 122 or as may be based on e.g., user preference. An exemplary embodiment of agitator post 202 is set forth in the figures and will now be further described.

Referring to FIGS. 3 through 11, for this exemplary embodiment, mechanism 200 includes an impeller interface 210 supported on impeller 204 and projecting along vertical axis VA. Impeller interface 210 is centrally-located and rotates with impeller 204 about vertical axis VA. For this exemplary embodiment, impeller interface 210 is a plastic component that has been molded separately and then sonically-welded to a connection post 205 of impeller 204. In other embodiments, impeller 204 may be integrally molded to, or with, impeller 204 or may be releasably attached to impeller 204. Other methods and materials of construction and attachment may also be used.

Agitator post 202 is removably positioned on impeller interface 210. More specifically, agitator post 202 defines an agitator recess 212 configured for complementary receipt of impeller interface 210 so that agitator post 202 may be supported thereon. Agitator recess 212 is shaped to match the shape of exterior surface 214 of impeller interface 210. For this embodiment, recess 212 and exterior surface 214 are rectangular-shaped. This shape assists in transferring torque between impeller 204 and agitator post 202 during a cleaning cycle wherein impeller 204 is rotated back and forth as previously described. This shape also assists in ensuring the agitator post 202 is properly oriented for the operation of certain connection features (e.g., latched recesses) as will be further described. As indicated by arrows U and D in FIGS. 5 through 7, agitator post 202 can be removed from impeller interface 210 by movement along vertical axis VA and the manipulation of such connection features.

Article movement mechanism 200 includes a plurality of latches 216 configured for movable receipt into a plurality of latch recess 218 to releasably secure agitator post 202 with impeller interface 210. For this exemplary embodiment, each latch 216 is supported on agitator post 202 within a slot 228 oriented longitudinally along vertical axis VA. A pin 230 extends through each latch 216 and through a bridge 232 defined by agitator post 202. Latch 216 pivots back and forth about pin 230.

Each latch includes a hook 234 that projects radially inward towards a latch recess 218. When agitator post 202 is in position on impeller interface 210 and latch 216 pivots about pin 230, hook 234 moves in and out of a respective latch recess 218. A plurality of biasing members 236 are in contact with latches 216 and the exterior surface of agitator post 202 within the latch recesses 218. For this exemplary embodiment, each biasing member 236 is constructed from a spring that is positioned between agitator post 202 and a lever arm 238 of each latch. Each biasing member 236 urges lever arm 238 radially outward and away from exterior surface 214 of agitator post 202 (i.e. in the direction of arrows J in FIG. 6) so that hook 234 is moved radially inward and into a latch recess 218 of impeller interface 210 (i.e. in the direction of arrows K in FIG. 6) when agitator post 202 is in position on impeller interface 210. As will be understood by one of skill in the art using the teachings disclosed herein, other spring and latch configurations may be used in other exemplary embodiments of the invention.

A user can readily remove or install agitator post 202 from article movement mechanism 200 and use latches 216 to release or secure agitator post 202 accordingly. Agitator post 202 can be removed from impeller interface 210 by pressing lever arms 238 radially inward as depicted by arrows P in FIG. 9. This causes latches 216 to rotate about pin 230 causing hooks 234 to move radially outward from latches recess 218. Agitator post 202 can then be lifted vertically upward as indicated by arrow U in FIGS. 5 through 7.

To replace agitator post 202, the user orients the shape of agitator recess 212 for complementary receipt of impeller interface 210. The rectangular shape of agitator recess 212 and exterior surface 214 of impeller interface 210 ensures that latches 216 will be received into the corresponding latch recesses 218 when agitator post 202 is properly oriented—as previously mentioned. As agitator post 202 is moved vertical downward along vertical axis VA, hooks 234 will slide along exterior surface 214 until reaching latch recess 218—at which point hooks 234 will move radially inward and into latch recesses 218 to secure agitator post 202 in position.

In other embodiments of the invention, a different number of latches 216 and latch recesses 218 with different alignments and spacings may also be used. For example, although shown as two each that are spaced 180 degrees apart for the exemplary embodiment in the figures, three latches 216 and latch recesses 218 with spacings of approximately 120 degrees apart could be used. Other configurations may also be applied including a single latch 216 and corresponding recess 218.

The operation of latches 216 can also be described with respect to an inner position shown in FIG. 8 and an outer position shown in FIG. 9. "Inner position" and "outer position" can be with reference to vertical axis VA in which "inner" describes a position where a latch 216 is moved radially towards vertical axis VA and "outer" describes a position where latch 216 is moved radially away from vertical axis VA. For this exemplary embodiment, such movement is generally along radial direction R, which is orthogonal to vertical axis VA.

"Inner position" and "outer position" can also describe whether a latch 216 is located within a latch recess 218 or is located out of a latch recess 218, respectively. When in the outer position, agitator post 202 can be removed or released from impeller interface 210 by pulling upwardly along the direction of arrow U. When in the inner position, the position of hooks 234 within latch recesses 218 precludes upward movement of agitator post 202 along the direction of arrow U.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing appliance, comprising:
a cabinet;
a wash tub positioned in the cabinet and defining a wash chamber;
a wash drum rotatably mounted within the wash chamber and configured for receiving articles for washing;
an impeller positioned in the wash drum, the impeller being rotational about a vertical axis and configured for imparting motion to the articles during washing, the impeller comprising a centrally-located impeller interface supported upon the impeller and projecting along the vertical axis from the impeller, the impeller interface defining a plurality of latch recesses spaced apart circumferentially;
an agitator post removably positioned upon the impeller interface;
a plurality of latches supported by the agitator post and spaced apart circumferentially, each latch configured for pivoting in and out of one of the latch recesses when the agitator post is positioned on the impeller interface; and
a plurality of biasing members, the biasing members connected to the latches and configured to urge the latches into the latch recesses when the agitator post is positioned on the impeller interface.

2. The washing appliance of claim 1, wherein the biasing members each comprise a hook projecting radially inward and into the latch recesses when the agitator post is positioned on the impeller interface.

3. The washing appliance of claim 2, wherein the biasing members each comprise a spring positioned between one of the biasing members and the agitator post along a radial direction perpendicular to the vertical axis.

4. The washing appliance of claim 2, further comprising a plurality of pins connected with the plurality of biasing members and about which biasing members pivot.

5. The washing appliance of claim 1, wherein the agitator post defines an agitator recess for complementary receipt of the impeller interface.

6. The washing appliance of claim 1, wherein the impeller interface includes a rectangular-shaped exterior surface and the agitator post defines a rectangular-shaped agitator recess configured for complementary receipt of the impeller interface.

7. The washing appliance of claim 1, wherein the impeller defines a connection post projecting along the vertical axis and configured for receipt of the impeller interface.

8. The washing appliance of claim 1, wherein the agitator post further comprises a helical vane extending around an outer surface of the agitator post.

9. The washing appliance of claim 1, wherein the impeller comprises a plurality of lobes spaced-apart along a circumferential direction of the impeller.

10. A washing appliance, comprising:
a cabinet;
a wash tub positioned in the cabinet and defining a wash chamber;
a wash drum rotatably mounted within the wash chamber and configured for receiving articles for washing;
an impeller positioned in the wash drum, the impeller being rotational about a vertical axis and configured for imparting motion to the articles during washing;
an impeller interface supported upon the impeller and projecting along the vertical axis, the impeller interface defining at least one latch recess;
an agitator post removably positioned upon the impeller interface;
at least one latch supported by the agitator post and configured for pivoting in and out of the latch recess when the agitator post is positioned on the impeller interface, wherein the latches are provided radially outward from the impeller interface; and
at least one biasing member connected to the latch and configured to urge the latches into the latch recess when the agitator post is positioned on the impeller interface.

11. The washing appliance of claim 10, wherein the at least one latch recess comprises a plurality of latch recesses spaced apart circumferentially around the impeller interface, the at least one latch comprises a plurality of latches supported by the agitator post and spaced apart circumferentially, each latch configured for pivoting in and out of one of the latch recesses when the agitator post is positioned on the impeller interface, and the at least one biasing member comprises a plurality of biasing members connected to the latches and configured to urge the latches into the latch recesses when the agitator post is positioned on the impeller interface.

12. The washing appliance of claim 11, wherein the biasing members each comprise a hook projecting radially inward and into the latch recesses when the agitator post is positioned on the impeller interface.

13. The washing appliance of claim 12, wherein the biasing members each comprise a spring positioned between one of the biasing members and the agitator post.

14. The washing appliance of claim 12, further comprising a plurality of pins connected with the plurality of biasing members and about which biasing members pivot.

15. The washing appliance of claim 11, wherein the agitator post defines an agitator recess for complementary receipt of the impeller interface.

16. The washing appliance of claim 11, wherein the impeller interface includes a rectangular-shaped exterior surface and the agitator post defines a rectangular-shaped agitator recess configured for complementary receipt of the impeller interface.

17. The washing appliance of claim 11, wherein the impeller defines a connection post projecting along the vertical axis and configured for receipt of the impeller interface.

18. The washing appliance of claim 11, wherein the agitator post further comprises a helical vane extending around an outer surface of the agitator post.

19. The washing appliance of claim 11, wherein the impeller comprises a plurality of lobes spaced-apart along a circumferential direction of the impeller.

* * * * *